Dec. 14, 1954 T. C. GRIFFIN Re. 23,906

ORDER BOARD

Original Filed March 9, 1951 3 Sheets-Sheet 1

INVENTOR.
Thomas C. Griffin
BY
H. A. McGrew
ATTORNEYS

ORDER BOARD

Original Filed March 9, 1951 3 Sheets-Sheet 2

INVENTOR.
Thomas C. Griffin
BY
N. A. McGrew
ATTORNEY

Dec. 14, 1954 T. C. GRIFFIN Re. 23,906

ORDER BOARD

Original Filed March 9, 1951 3 Sheets-Sheet 3

INVENTOR.
Thomas C. Griffin

BY

ATTORNEY

United States Patent Office

Re. 23,906

Reissued Dec. 14, 1954

23,906

ORDER BOARD

Thomas C. Griffin, Denver, Colo., assignor to Griffin Specialty Company, a corporation of Colorado Original No. 2,664,302, dated December 29, 1953, Serial No. 214,678, March 9, 1951. Application for reissue September 7, 1954, Serial No. 454,630

24 Claims. (Cl. 282—29)

Matter enclosed in heavy brackets [ ] appears in the original patent but forms no part of this reissue specification; matter printed in italics indicates the additions made by reissue.

The present invention relates to an order board. It has to do particularly, although not exclusively, with a new and improved board which may be used to adjustably and conveniently position separate order forms, or the like, with respect to the lines and columns of the separate forms.

The present invention is related generally to the inventions embraced in my co-pending applications, Serial Nos. 46,647, filed August 29, 1948, now Patent 2,630,335, issued March 3, 1953, and 83,671, filed March 26, 1949, and is, in effect, an improvement upon the inventions covered by both of said applications.

Whereas the base portion of the order board of each of the above-mentioned co-pending applications is formed in one piece and therefore is of fixed size or dimension, the base portion of the order board of the instant application is sectional and readily adjustable as to size.

It is, therefore, one of the important objects of the present invention to provide a new and improved order board having an improved base or work-supporting portion which is adjustable as to size to provide a greater surface area for the support and use of the order forms.

Another object of the present invention is to provide an improved base portion or support having an improved adjustable line guide carried thereby and removable therefrom.

A further object of the present invention is to provide an improved order board unit wherein the carrier section is substantially the full dimension of the unit itself.

Another object of the present invention is to provide an order board having a base or supporting portion formed in relatively movable sections, in which the sections may be releasably locked together in various adjusted positions to locate the desired columns of the order forms.

A further object of the present invention is to provide an improved order board unit consisting of a so-called fixed section and a movable carrier section, in which the carrier section is of substantially the full dimension of the unit.

Another object of the present invention is to provide the carrier section with form-attaching means adjacent an edge thereof, in which said means is adjustable relative to the carrier section and bodily removable therefrom; another object of the invention being to provide order form-supporting means having movable paper-engaging rings for cooperation with perforations in certain of the order forms.

The foregoing and other objects and advantages of the present invention will appear from the following description and appended claims when considered in connection with the accompanying drawings forming a part of this specification, wherein like reference characters designate corresponding parts in the several views.

Figure 7:
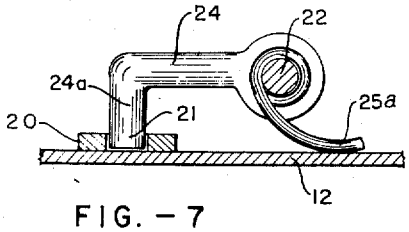
Figure 8:
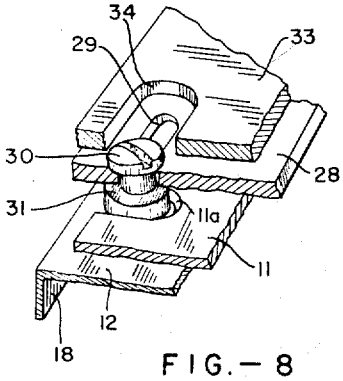

Fig. 7 is a fragmentary side elevational view, partly in section, of the releasable locking or latching means, or dog for maintaining the so-called fixed and the movable sections of the order board unit in adjusted positions, the parts being shown upside down; and Fig. 8 is an enlarged fragmentary perspective view, partly in section and partly in elevation, with parts broken away for clarity and illustrating means for permitting the order form-supporting means to be adjusted relative to the carrier section by which it is supported.

Before explaining in detail the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Figure 1:
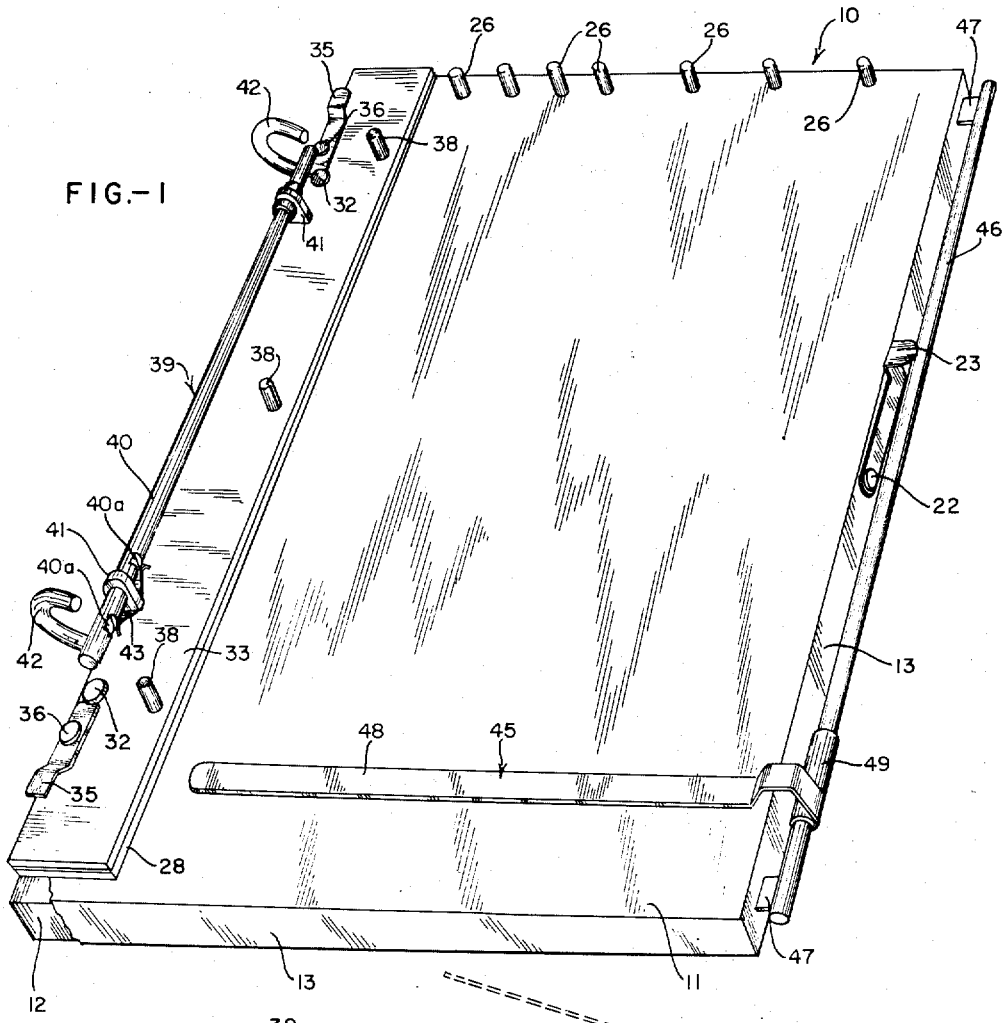
Fig. 1 is a perspective view, partly broken away, of an order board unit embodying the present invention, with the sections of said unit in retracted or collapsed condition.
Figure 2:
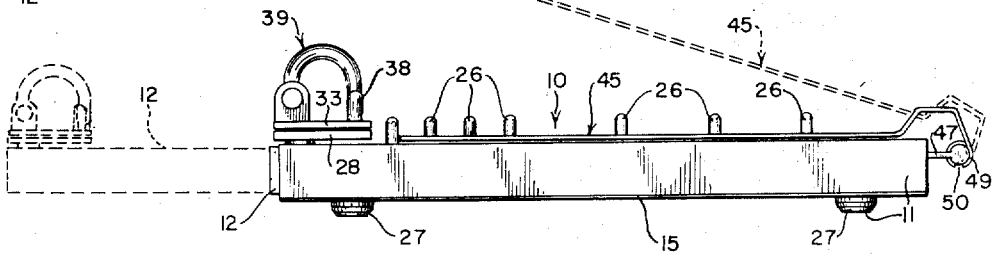
Fig. 2 is an end elevational view of the order board unit of Fig. 1, showing in broken lines, one extended or projected position of the carrier section of the unit and an elevated position of the improved line guide of the unit.
Figure 5:
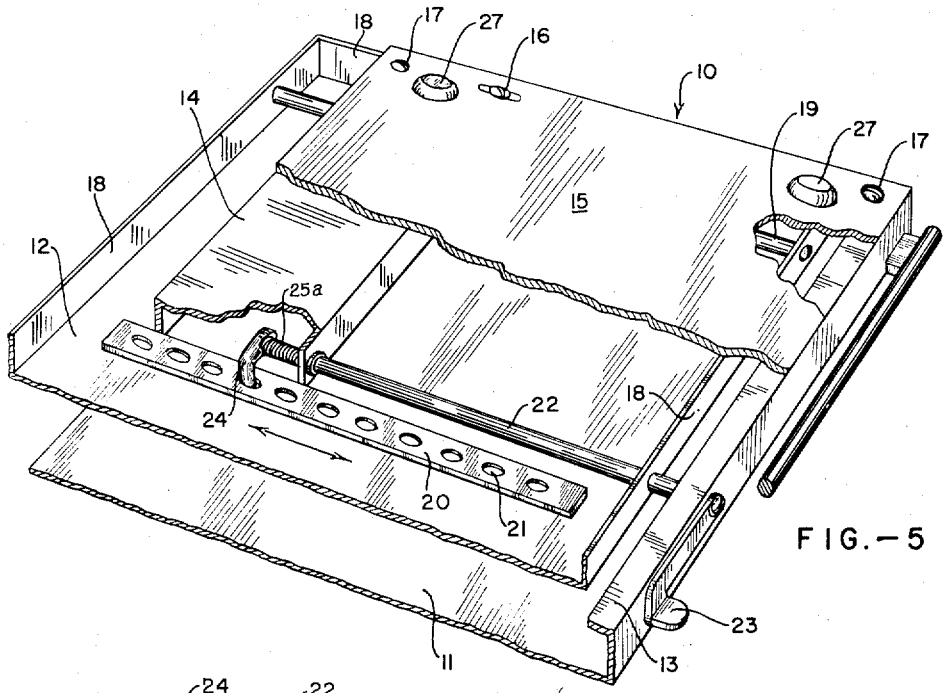
Fig. 5 is a fragmentary underside perspective view of the order board of Figs. 1 and 2, parts being broken away to reveal the locking or latching mechanism for the sections of the unit.

With particular reference now to Figs. 1, 2 and 5 of the drawings, the order board unit of the present invention is shown as a whole at 10. The unit comprises, as shown, two telescoping sections or portions, one such section, the so-called immovable section, being shown as a whole at 11 and the other section known as the so-called carrier section, being shown as a whole at 12. Section 12 is adapted to be moved into and out of section 11 and is, therefore, somewhat smaller in area but actually is substantially the full dimension of section 11 into which it telescopes. *The section 12 and the top wall of the section 11 are thus in overlapping relationship, providing lower and upper supporting surfaces, respectively, so that when the lower section 12 is moved out from its fully overlapped position, it provides an extended supporting surface.* This arrangement provides for an extremely large surface area when the sections are in open or projected position. When collapsed or retracted, the overall area is reduced so as to provide a unit which is capable of easy handling and transporting in use.

The so-called immovable section or portion 11 is provided on one of its long sides and on its two shorter sides with a flange 13, this flange, as shown, being substanitally L-shaped in cross section, see particularly Fig. 5 of the drawing. The unflanged longer side of section 11 is provided with a reinforcing relatively wide channel-like member 14, see also Fig. 5, which extends between and is attached to the short side flanges 13. This member 14 actually provides a flange for the second longer side of section 11. Section 11 has a bottom cover plate 15. The channel-like member 14 is preferably secured to the flanges 13 of member 11 by screws or the like 16 and the bottom cover plate 15 is held to the flanges 13 of section 11 by screws or the like 17, some of which screws also serve to hold the channel-like member 14 to member 11.

The carrier section 12, as shown, see particularly Fig. 5, is provided with a surrounding depending flange 18. The carrier section 12 also has a pair of spaced combined reenforcing and guide rods 19, one such being shown in Fig. 5. These guide rods are secured at their outer ends to the opposite flanges 18 of member 12 and extend through openings formed in the flanges of the channel-like member 14. Thus, when the section 12 is moved inwardly and outwardly, *toward and away from the section 11*, it travels in a straight line path.

Figure 3:
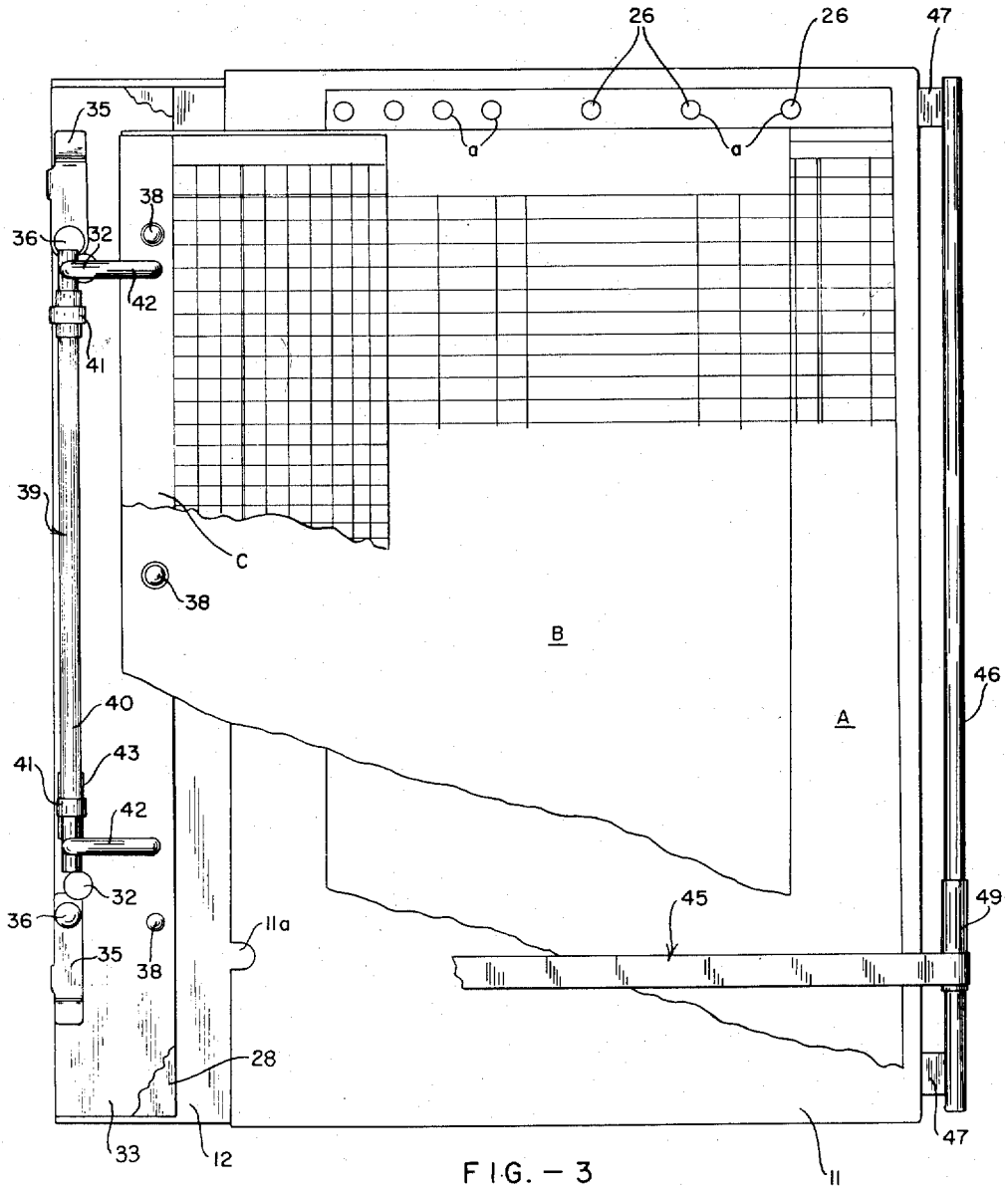
Fig. 3 is a top plan view of the order board of Fig. 1, parts being broken away for purposes of clarity, and showing the application to the unit of certain types of order forms.

It is, of course, desirable to adjust the movable or carrier section 12 with relation to the other section 11 at various desired positions so as to properly line up the columns of the separate order forms, such as those shown at A, B and C in Fig. 3. For this purpose, see Fig. 5, the underface or surface of section 12 is provided with a metal strip 20 having a series of aligned sockets or perforations 21 formed therein. This strip may be secured to the underside of section 12 in any suitable manner as by welding or soldering. Other material may be substituted for metal. A latch rod or bar 22 having an operating handle 23 and carrying at its inner end a preferably spring pressed latch dog 24, is journaled in the inner flange of the channel-like reinforcing member 14 and in the flange 18 of member 12 and the adjacent flange 13 of member or section 11. A short length of relatively stiff spring 25 is wrapped or wound around the end portion or rod 22, with the free end of the spring, shown at 25a in Fig. 7, resting against the surface of member or section 12. The tendency of spring 25 is to normally maintain the lead end 24a of dog 24 in position within one of the sockets or depressions 21 so that the sections 11 and 12 are normally maintained in position and against relative movement until the finger piece or operating control handle 23 is depressed. This action moves the dog 24 out of its normally seated position within a socket member 21 against the action of the spring 25. When the finger piece 23 is released, the spring automatically returns and maintains the dog seated in a socket or recess 21. By varying the spacing of the holes or sockets 21 in strip 20, the device may be adjusted so as to properly adjust and align columns of the order blanks or forms used by the unit. Moreover, it is to be understood that other suitable means for maintaining the sections 11 and 12 in various adjusted positions may be substituted for the mechanism shown in the drawings.

The top flat writing surface of section 11 preferably adjacent the upper shorter side thereof, is provided with a series or plurality of preferably tapered pins 26. These pins 26 may correspond in number and in spacing along the top of the section 11 with the number and spacing of the perforations a in order form A. The perforations formed in the order sheets are usually standardized and for this reason a definite arrangement of the tapered pins 26 may be followed.

The section 11 of the unit on its underside is provided with means for supporting the entire order board unit upon a supporting surface. As seen in Figs. 2 and 5, this means is in the form of buttons, or the like 27, one thereof being preferably disposed adjacent each of the corners of the closure plate 15 at the bottom of section 11.

Cooperating telescoping carrier section 12 is provided with means for supporting additional order forms in position so as to cooperate with order form A. As shown in Fig. 3, section 12 carries the order forms B and C, although this may be varied in accordance with the particular job to be performed by the order board unit. *When the sections 11 and 12 are moved apart as indicated by the dotted lines in Fig. 2, away from the position of section 12 fully overlapped by the top of the section 11, the forms B and C are supported by the top surface of the section 12.*

With particular reference now to Figs. 1, 2, 3 and 8 of the drawings, it will be seen that the means for supporting order forms B and C is arranged adjacent the outer long side of carrier section 12. This means, as shown, comprises an adjustable elongated flat plate or strip member 28 which is provided with longitudinally spaced elongated slots 29 to register with the shank portions of threaded studs or screws 30 which are threaded into spacer block members 31. These spacer members or blocks 31 are secured to the top surface of carrier section 12, there being two such members located adjacent the upper and lower left hand corners of section 12 as viewed in Fig. 3. The slots 29 in member 28 permit the member to be slid relative to the section 12 and in a substantially straight line path adjacent the outer longer side of section 12. Strip 28 is provided adjacent the slots 29 with upstanding stud members which are slotted annularly, these studs or members being shown at 32 in Figs. 1 and 3.

The means or device for supporting the order blanks, such as the blanks or forms B and C, also includes another elongated plate or strip 33 which is provided with a pair of holes or openings adapted to register with the studs 32 so that strip 33 may be positioned directly upon strip 28 to be movable as a unit with it when desired. The round holes or openings formed in member 33 are not shown in the drawings but it will be understood that they are positioned with respect to the ends of member 33 correspondingly to the positions of the studs 32 carried by strip member or plate 28 so as to cooperate therewith. Member 33 is also provided with a pair of spaced longitudinally extending elongated slots or openings 34, one such being shown in Figs. 6 and 8. These slots 34 register with and clear the threaded studs or screws 30 so as to permit the elongated plate member 33 to lie flat upon the lower elongated member 28 when the parts are assembled.

Figure 6:
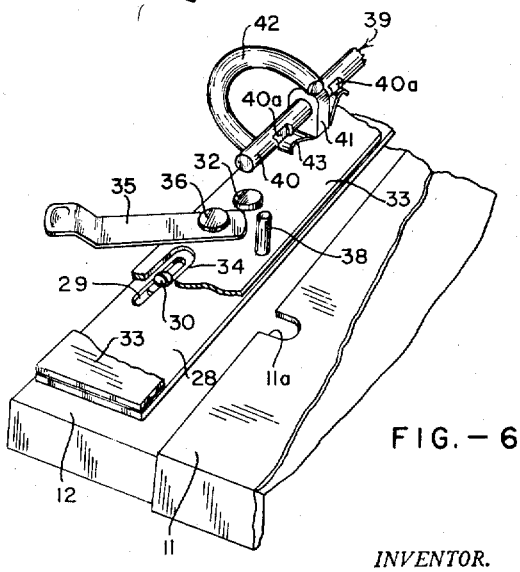
Fig. 6 is a fragmentary perspective view, on an enlarged scale, looking at the top surface of the lower left hand corner of the unit shown in Fig. 3, and illustrating certain positions of the parts of the order form-supporting means and associated parts.

While the members 28 and 33 are separable, with upper member 33 being easily removable from lower member 28, it is desired when this particular equipment is to be used in connection with the order board unit, to maintain the upper plate 33 in fixed position with relation to the lower plate 28 to function with it as a unit. For this purpose, there is provided a pair of latch members 35 pivotally mounted at 36 to member 33, see Figs. 1, 3 and 6. These latch members may be swung from the released position in which one of them is shown in Fig. 6 to the locked position in which these members are shown in Figs. 1 and 3. When in locked position it will be understood that the lead ends of latch members 36 engage in the peripheral or annular slots in the studs 32.

The long left edge portion of section 11 is preferably provided with a pair of substantially U-shaped notches 11*a*, see Figs. 3, 6 and 8. These notches coincide with the spacing members 31 to permit the carrier section 12 to be substantially fully telescoped within the other section 11 when the parts are in the position in which they are shown in Fig. 1.

The upper elongated plate member 33 carries spaced preferably tapered pins 38, three such being shown. The spacing and number of these pins 38 may, of course, vary in accordance with the particular number and spacing of perforations along the adjacent marginal edges of the order forms, such as order forms B and C shown in Fig. 3. It will be understood, of course, that these supporting pins 38 are provided for the purpose of holding the desired order forms so that they can be properly aligned as to lines and/or columns, with the lines and/or columns of order form A.

In certain uses or operations of the order board unit of the present invention, it may be desirable to be able to move the order forms, such as those shown at B and C, off the unit temporarily, as by being swung toward the left away from the unit, as viewed in Figs. 1 and 3. For this purpose, there has been provided a removable order form support and swingable ring assembly which is indicated as a whole at 39 in Figs. 1, 2, 3 and 6. This movable or swingable support and ring section comprises, as shown, a rod 40 which is journaled adjacent its opposite ends in bearings 41 carried by the elongated top plate or strip 33. Adjacent each end, the rod is provided with a fixed hook-like member 42. Each of these members is substantially U-shaped and when the rod 40 is swung in a clockwise direction, the free ends of the hook members will be brought into contact with the surface of strip 33 and will assume the positions in which they are shown in Figs. 2 and 3. These hook members 42 may be so arranged or positioned as to coincide with perforations in the marginal edges of the order forms. This will permit those forms, when desirable, to be lifted from their flatwise position on the order board and swung to the left as viewed in Fig. 3, so as to be free of the work surface of the board while at the same time being retained by the ring members 42. It is desirable to releasably maintain the ring assembly normally in its position of use, as shown in Figs. 2 and 3 and for this purpose there is provided a relatively stiff leaf spring 43 whose mid-section is supported beneath one of the bearings 41 and whose outwardly flared upper free ends are adapted to engage in notches 40a formed in rod 40, see particularly Figs. 1 and 6 of the drawings. These notches 40a are preferably arranged on opposite sides of the bearing or support 41 as is clearly shown in the drawings. It seems unnecessary to provide the rod assembly 39 with more than a single spring member 43. If it appears to be desirable, however, a pair of such springs can be provided, one for each of the bearings or supports 41.

When the removable order form support and ring assembly, constituting the parts 28, 33, 39, etc., is employed in connection with the order board unit, the entire assembly is adjustable in a straight line path relative to the carrier section 12 by which it is supported. This assembly does not interfere in any way with the telescoping of the sections when it is desired that they be moved to their retracted position of Fig. 1. The order form support and ring assembly 39 and its supporting base or plate 33 may be entirely removed from the order board unit if and when desirable, by simply releasing the latch members 35 to permit plate 33 to be lifted off the adjustable plate 28 which latter preferably remains as a part of the unit. When the tapered supporting pins 38 are being used to hold order forms in place on the board, it is not at all necessary that the ring unit 39 be employed. This unit may be swung either in a counterclockwise direction to its position as shown in Fig. 1 of the drawings, or it may be allowed to remain in its lowered position, as seen in Figs. 2 and 3 of the drawings, in either of which positions it does not interfere in any way with the operation or use of the order board by permitting free use of the order form receiving and supporting pins 38.

It will be understood that the present order board provides free and universal adjustment of the positions of the various order forms when an adjustment of the sections is effected by operating the handle 23 to release the dog 24 from engagement with a socket 21. The parts will remain in their new and properly set positions, with the forms arranged as desired, until the spring-pressed dog is again released and the carrier section 12 and the so-called immovable section 11 are again shifted relative to each other.

Figure 4:
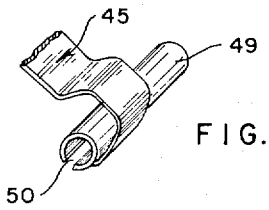
Fig. 4 is an enlarged fragmentary perspective view of a portion of the improved line guide, illustrating the construction which permits its removal from the order board unit.

The order board in accordance with the present invention is preferably provided with a line guide, shown as a whole at 45 in the drawings. This line guide is supported by a rod 46 which is secured by suitable bracket members 47 to the flange 13 at the right hand long side of section 11 of the board, as viewed in Fig. 1. The line guide 45 has a blade portion 48 and a substantially cylindrical hub or mounting portion 49. As seen in Fig. 4, the hub or mounting portion 49 is slotted lengthwise at 50 to permit it to be slipped off the supporting rod 46, the slot 50 allowing the line guide to clear the supporting bracket or member 47. Thus, the guide may be swung into and out of contact with the order forms on the board or, if desired, it may be removed bodily from the board. The line guide permits easy location of items on the forms and also assists in the alignment of the lines or items on overlapping or adjacent order forms.

The sections 11 and 12 of the order board unit of the present invention are preferably formed from some light weight metal, such as aluminum, or aluminum alloy, or other alloy. The other parts of the unit are also preferably formed from some suitable light weight metal although the gauge of the metal will vary in accordance with the particular parts. Nevertheless, other suitable materials may be employed for the production of the order board and it is not necessarily formed from metal. It is entirely conceivable that a major portion of the order board, or at least a number of the parts or portions thereof, could be formed from some suitable plastic, or other non-metallic material. Thus, any possible shortage of materials will not necessarily affect the manufacture of order boards in accordance with the present invention.

Having thus described the invention, what is claimed is:

1. An order board for use in positioning order forms and the like, comprising a relatively flat base portion formed in two relatively movable telescoping sections, the inner section of which has an edge exposed in all positions of said sections means associated with one of said sections and disposed along and adjacent a side thereof for removably supporting order forms, and means associated with the normally exposed edge of said inner section and located along and adjacent a side of said inner section and extending in a line substantially perpendicular to the first-named means for removably supporting additional order forms said last named means associated with said inner section being arranged to extend laterally over to overlap the top writing surface of said outer section when said inner section is telescoped entirely within said outer section.

2. An order board for use in positioning order forms and the like, comprising a relatively flat base portion formed in two relatively adjustable, telescoping sections of substantially equal area, the inner section of which has an edge exposed in all positions of said sections means associated with one of said sections and disposed adjacent a side thereof in substantially a straight line for removably supporting order forms, means associated with the normally exposed edge of said inner section and located adjacent a side thereof and extending in a line substantially perpendicular to the first-named means for removably supporting additional order forms said last named means associated with said inner section being arranged to extend laterally over a side edge of said outer section to overlap the top writing surface of said outer section when said inner section is telescoped entirely within said outer section, and releasable locking means associated with both of said sections for maintaining said sections in various relative adjusted positions.

3. An order board for use in positioning order forms and the like, comprising a relatively flat base portion formed in two relatively adjustable telescoping sections, the inner section of which has a margin exposed in all positions of said sections means associated with one of said sections and disposed in a line adjacent a side thereof for removably supporting order forms, and removable means carried by the normally exposed margin of said inner section and disposed adjacent a side thereof and extending in a line substantially perpendicular to the first-named order form supporting means for removably supporting additional order forms said last named means associated with said inner section being arranged to extend laterally over a side edge of said outer section to overlap the top writing surface of said outer section when said inner section is telescoped entirely within said outer section.

4. An order board according to claim 3, wherein releasable latching means is associated with both of said sections for maintaining the sections in various adjusted positions.

5. An order board according to claim 3, wherein releasable latching means is associated with both of said sections for maintaining the sections in various adjusted positions, said releasable latching means including a spring-urged dog carried by one of the sections and spaced socket means carried by the other section for removably receiving said dog to maintain the sections normally against relative movement while permitting relative adjustment of said sections when the latching means is released.

6. An order board for use in positioning order forms and the like, comprising a relatively flat base portion formed in two relatively slidable telescoping sections the inner section of which has an edge exposed in all positions of said sections, a plurality of spaced upstanding pins extending in a line along and adjacent to the top edge of said outer section for receiving and removably supporting order forms, and a plurality of spaced upstanding pins extending from said exposed edge of the inner of said sections for receiving and removably supporting other order forms.

7. An order board according to claim 6, wherein releasable latching means is associated with the two sections to releasably maintain them in various relative adjusted positions.

8. An order board according to claim 6, wherein the second-named plurality of spaced pins is carried by a plate removably mounted upon the second-named section and overlapping the side edge and upper surface of said outer section when said inner section is telescoped entirely within said outer section.

9. An order board assembly for use in positioning order forms and the like, having relatively slidable inner and outer telescoping sections, means associated with said outer section and disposed adjacent the top edge thereof for receiving and removably supporting order forms, and means including a longitudinally adjustable plate and spaced pins carried by the plate disposed adjacent the left edge of the inner section and overlapping the side edge and top writing surface of said outer section when said inner section is telescoped entirely within said outer section, and said plate being removably mounted upon said inner section for receiving and supporting additional order forms.

10. An order board assembly according to claim 9, wherein the longitudinally adjustable plate is provided with a swingable paper ring for supporting certain of said order forms at predetermined times.

11. An order board assembly according to claim 9, wherein an adjustable and removable line guide is associated with said order board assembly in position to overlap the order forms attached to both sections.

12. An order board for use in positioning record sheets and the like, comprising a relatively flat base portion formed of inner and outer relatively movable telescopic sections with said inner section sliding into and out of a side edge of the outer section to be relaitvely movable transversely thereof, said outer section having a flat top writing surface with means disposed along its top edge for removably supporting record sheets, said inner section having a side margin normally exposed when said section is telescoped entirely within said outer section, and means mounted upon said normally exposed side margin of said inner section and extending laterally across a side edge of said writing surface when said inner section is disposed entirely within said outer section for supporting other record sheets whereby the latter may be moved transversely of the record sheets of the outer section as the inner section is moved to all positions relative to said outer section.

13. An order board for use in positioning record sheets and the like, comprising a relatively flat base portion formed of inner and outer relatively movable telescopic sections with said inner section sliding into and out of a side edge of the outer section to be relatively movable transversely thereof, said outer section having a flat top writing surface with means disposed along its top edge for removably supporting record sheets, said inner section having a side margin normally exposed when said section is telescoped entirely within said outer section, and means mounted upon said inner section adjacent said exposed margin and adapted to overhang a side edge of said writing surface and overlap said outer section when said inner section is telescoped entirely within said outer section, said last named means having means for supporting other record sheets.

14. An order board for use in positioning record sheets and the like, comprising a relatively flat base portion formed of inner and outer relatively movable telescopic sections with said inner section sliding into and out of a side edge of the outer section to be relatively movable transversely thereof, said outer section having a flat top writing surface with means disposed along its top edge for removably supporting record sheets, said inner section having a side margin normally exposed when said section is telescoped entirely within said outer section, and a plate extending parallel with said exposed margin and mounted upon said inner section to overlap a side edge of said top writing surface of said outer section when said inner section is telescoped entirely within said outer section, said plate being adjustable independently of said sections and parallel with said exposed margin and having means for supporting the other record sheets.

15. An order board for use in positioning record sheets and the like, comprising a relatively flat base portion formed of inner and outer relatively movable telescopic sections with said inner section sliding into and out of a side edge of the outer section to be relatively movable transversely thereof, said outer section having a flat top writing surface with means disposed along its top edge for removably supporting record sheets, said inner section having a side margin normally exposed when said section is telescoped entirely within said outer section, a plate extending parallel with said exposed margin and mounted upon said inner section to extend laterally across a side edge of said writing surface to overlap said outer section when said inner section is telescoped entirely within said outer section, said plate being adjustable in a direction parallel with said exposed margin, a second plate substantially coextensive with aforesaid plate and having means for supporting other record sheets, and means for inter-locking said two plates to move as a unit.

16. An order board for use in positioning record sheets and the like, comprising a relatively flat base portion formed of inner and outer relatively movable telescopic sections with said inner section sliding into and out of a side edge of the outer section to be relatively movable transversely thereof, said outer section having a flat top writing surface with means disposed along its top edge for removably supporting record sheets, said inner section having a side margin normally exposed when said section is telescope entirely within said outer section, a plate extending parallel with said exposed margin and mounted upon said inner section to overhang the side edge of said writing top surface and overlap said outer section when said sections are entirely telescoped one within the other, said plate being adjustable in a direction parallel with said exposed margin, a second plate substantially coextensive with aforesaid plate and having means for supporting other record sheets, a swingable record sheet ring assembly mounted upon said second plate and provided with hooks to coincide with perforations in said second named record sheets or to retain still other record sheets.

17. An order board for use in positioning record sheets and the like, comprising a relatively flat base portion formed of inner and outer relatively movable telescopic sections with said inner section sliding into and out of a side edge of the outer section to be relatively movable transversely thereof, said outer section having a flat top writing surface with means disposed along its top edge for removably supporting record sheets, said inner section having a side margin normally exposed when said section is telescoped entirely within said outer section, a pair of upstanding shouldered posts carried by said inner section adjacent said exposed margin, a plate extending parallel with said exposed margin and having elongated slots to cooperate with said posts to be adjustably supported upon the shoulders of said posts and to overlap said top writing surface of the outer section when said sections are telescoped entirely one within the other, and means mounted upon said plate for supporting other record sheets.

18. An order board for positioning record sheets and the like, comprising a relatively flat base portion formed in inner and outer telescopic sections with said inner section sliding into and out of a side edge of said outer section to be relatively movable transversely thereof, said sections having means disposed along their edges for supporting record sheets, said sections having depending flanges, said inner section having rods between its flanges slidably mounted in the flanges of said outer section and also having a notched portion extending parallel with said rods, and a spring returned rotary latch rod parallel with aforesaid rods mounted in the depending flanges of said sections and having a dog at one end cooperating with said notched portion, and an operating handle at its other end arranged at the side of said outer section to swing in a plane parallel therewith for releasably retaining said sections in various relative adjusted positions.

19. An order board for use in positioning record sheets and the like, comprising a base portion formed of inner and outer relatively movable telescopic sections with the inner section slidable into and out of a side edge of the outer section, said outer section having a flat top writing surface with one side edge thereof provided with a pair of spaced notches, said writing surface having means disposed along its top edge for removably attaching record sheets, said inner section having a pair of upstanding spacer blocks adapted to be disposed in said notches when said inner section is telescoped entirely within said outer section, a plate extending parallel with a side edge of said writing surface and being slotted to be adjustably supported upon said blocks, and said plate overlapping said side edge of said writing surface to overlap the latter when said inner section is moved almost to a completely nested relation within said outer section, screw means extending through said slotted plate and into said spacer blocks for retaining said plate in adjusted positions with respect to said sections, and means mounted upon said plate for attaching other record sheets thereto in a position to overlie said first named record sheets and to be movable transversely or parallel relative to said side edge of said writing surface.

20. The structure recited in claim 19 wherein said screw means consists of a pair of screws extending through said plate and into said spacer blocks to guide said plate parallel with said side edge of said writing surface, said plate having upstanding shouldered studs, a second plate adapted to be superimposed upon said first named plate and having apertures to receive said studs, and said second named plate having latch members pivoted thereto and adapted to engage said studs to clamp said second named plate upon said first named plate to move as a unit therewith, and means extending upwardly from the top of said second plate for attaching record sheets thereto to overlie the record sheets supported upon said outer section.

*21. An order board for use in positioning order forms and the like, comprising a relatively flat base portion formed in two laterally slidable relatively adjustable, overlapping sections of substantially equal area, the lower section of which has an edge exposed in all positions of said sections, means associated with the upper one of said sections and disposed adjacent a side thereof in substantially a straight line for removably supporting order forms, means associated with the normally exposed edge of said lower section and located adjacent a side thereof and extending in a line substantially perpendicular to the first-named means for removably supporting additional order forms, said last-named means associated with said lower section being arranged to extend laterally over a side edge of said upper section to overlap the top writing surface of said upper section when said lower section is positioned fully below said upper section, and releasable locking means associated with both of said sections for maintaining said sections in various relative adjusted positions.*

*22. An order board for use in positioning order forms and the like, comprising a relatively flat base portion formed in two relatively adjustable overlapping sections, the lower section of which has a margin exposed in all positions of said sections, means associated with the upper one of said sections and disposed in a line adjacent a side thereof for removably supporting order forms, and removable means carried by the normally exposed margin of said lower section and disposed adjacent a side thereof and extending in a line substantially perpendicular to the first-named order form supporting means for removably supporting additional order forms, said last-named means associated with said lower section being arranged to extend laterally over a side edge of said upper section to overlap the top writing surface of said upper section when said lower section is positioned fully below said outer section.*

*23. An order board for use in positioning order forms and the like, comprising a relatively flat base portion formed in two relatively slidable overlapping sections the lower section of which has an edge exposed in all positions of said sections, a plurality of spaced upstanding pins extending in a line along and adjacent to the top edge of said upper section for receiving and removably supporting order forms, and a plurality of spaced upstanding pins extending from said exposed edge of said lower section for receiving and removably supporting other order forms.*

*24. An order board assembly for use in positioning order forms and the like, having relatively slidable upper and lower overlapping sections, means associated with said upper section and disposed adjacent the top writing edge thereof for receiving and removably supporting order forms, and means including a longitudinally adjustable plate and spaced pins carried by the plate disposed adjacent the left edge of the lower section and overlapping the side edge and top surface of said upper section when said lower section is positioned fully below said upper section, and said plate being removably mounted upon said lower section for receiving and supporting additional order forms.*

References Cited in the file of this patent or the original patent

UNITED STATES PATENTS

| Number | Name | Date |
|---|---|---|
| 863,480 | Wolf | Aug. 13, 1907 |
| 971,725 | Brunson | Oct. 4, 1910 |
| 1,153,878 | Rosenberg | Sept. 14, 1915 |
| 1,278,488 | McCann | Sept. 10, 1918 |
| 1,606,762 | Guina | Nov. 16, 1926 |
| 2,330,886 | Hediger | Oct. 5, 1943 |

FOREIGN PATENTS

| Number | Country | Date |
|---|---|---|
| 64,197 | Norway | Dec. 1, 1941 |